United States Patent [19]

Arai

[11] Patent Number: 4,867,507
[45] Date of Patent: Sep. 19, 1989

[54] STRUCTURE FOR FIXING THE TERMINAL END OF A TRIM COVER ASSEMBLY IN AN AUTOMOTIVE SEAT

[75] Inventor: Yoshio Arai, Akishima, Japan
[73] Assignee: Tachi-S Co., Ltd., Japan
[21] Appl. No.: 177,858
[22] Filed: Mar. 22, 1988

Related U.S. Application Data

[63] Continuation of Ser. No. 927,355, Nov. 4, 1986, abandoned.

[51] Int. Cl.⁴ ............................................. A47C 31/02
[52] U.S. Cl. .................................... 297/218; 297/452
[58] Field of Search ............... 297/218, 219, 452; 5/402

[56] References Cited

U.S. PATENT DOCUMENTS

| | | | |
|---|---|---|---|
| 2,203,007 | 6/1940 | Bartel et al. | 5/402 |
| 3,797,886 | 3/1974 | Griffiths | 297/452 |
| 3,860,287 | 1/1975 | Platt | 297/452 |
| 3,928,898 | 12/1975 | Smoot | 297/218 X |
| 3,981,534 | 9/1976 | Wilton | 297/218 X |
| 4,564,239 | 1/1986 | Akimoto | 297/219 X |

Primary Examiner—Peter R. Brown
Attorney, Agent, or Firm—Oldham & Oldham Co.

[57] ABSTRACT

A structure for fixing the terminal end of a trim cover assembly to an L-shaped frame in an automotive seat in which a plurality of spring members are extended across the frames. A hook member formed of synthetic resin having a shock-absorbing and sound-arresting property is provided at the terminal end of the trim cover assembly and is then interposed between the spring member and the tip end of the frame. As a result of this, even when the spring member is flexed due to loads applied thereto, the spring member is prevented from coming into direct contact with the frame tip end and thus there is eliminated the possibility that strange sounds may be generated due to the contact of the spring member with the tip end of the frame.

4 Claims, 2 Drawing Sheets

STRUCTURE FOR FIXING THE TERMINAL END OF A TRIM COVER ASSEMBLY IN AN AUTOMOTIVE SEAT

This is a continuation application of prior U.S. Ser. No. 06/927,355 filed on Nov. 4, 1986, which is now abandoned.

BACKGROUND OF THE INVENTION

1. Field of the Invention

The present invention relates to a structure for fixing the terminal end of a trim cover assembly included in an automotive seat and, more particularly, to an improved structure for fixing the terminal end of the trim cover assembly to the bottom portion of a frame for a seat cushion when support members such as S-springs or similar members are extended across the seat cushion frame, a cushion member of foam material or the like is placed over the support members and the seat cushion frame, support members and cushion member are wholly covered by the trim cover assembly.

2. Description of the Prior Art

Conventionally, as a structure of this kind, there is known a structure which is shown in FIG. 1. In this figure, reference numeral (1) designates an L-shaped frame for a seat cushion. The seat cushion frame (1) includes a horizontal portion the tip end (1a) of which is folded upwardly and which is cut and raised substantially in the central portion thereof to provide a hook piece (1b). The hook piece (1b is provided such that it is located at a given interval from the horizontal portion of the frame (1). Although not shown in FIG. 1, on the opposite side of the frame (1) there is arranged another frame which is likewise provided with a hook piece (1b). And, between the hook pieces (1b) of the right and left frames (1) there are extended spring members (2) respectively formed of S-springs, on which spring members (2) a cushion member (3) formed of foam material is to be placed. Then, a trim cover assembly (4) is used to cover the above-mentioned foam cushion member (3) and after then the terminal end (4a) of the trim cover assembly (4) is secured to the tip end (1a) of the horizontal portion of the frame (1) by a hog ring (5) formed of metal.

However, in the above-mentioned conventional structure for fixing the terminal end of the trim cover assembly constructed in the above-mentioned manner, due to the fact that the terminal end (4a) of the trim cover assembly (4) is fixed to the frame (1) by securing the terminal end (4a) to the horizontal portion tip end (1a) of the frame by means of the hog ring (5) and the spring members (2) are extended between the hook pieces (1b), when the spring member (2) is flexed due to loads applied, then the flexed spring member (2) comes in contact with the horizontal portion tip end (1a) of the frame (1) to produce strange sounds, which impairs the comfortable sitting feeling of an occupant. Also, since the terminal end (4a) of the train cover assembly (4) must be secured to the horizontal portion tip end (1a) of the frame (1) with the hog ring (5), the conventional structure takes time to fix the terminal end (4a) of the trim cover assembly.

SUMMARY OF THE INVENTION

The present invention aims at eliminating the drawbacks found in the above-mentioned prior art trim cover assembly terminal end fixing structure.

Accordingly, it is an object of the invention to provide an improved trim cover assembly terminal end fixing structure which eliminates the possibility of a spring member extended across frame hook pieces coming into contact with the tip end of the horizontal portion of a frame so as to prevent the production of strange sounds and also which permits an easy operation to fix the terminal end of a trim cover assembly.

In attaining the above object, according to the invention, there is attached to the ends of the trim cover assembly a hook member which is formed of synthetic resin to serve as a damper and a sound-arrester, and the hook member is hookingly engaged with the contact surface of the spring member, which covers the tip end of the frame horizontal portion. In other words, due to the interposition of the hook member between the spring member and the tip end of the horizontal portion of the frame, the hook member can act as a sound-arrester and a shock absorber to eliminate the possibility of the abovementioned strange sounds being generated.

Also, since, when the automotive seat is formed, the end of the trim cover assembly can be secured to the frame by means of the hook, the mountability of the trim cover assembly relative to the frame is highly improved.

BRIEF DESCRIPTION OF THE DRAWINGS

The above and other objects, features, and advantages of the present invention will be more fully apparent to those of ordinary skill in the art to which this invention pertains from the following detailed description, when considered in connection with the accompanying drawings, in which like reference characters designate like or corresponding parts throughout the several views, and wherein.

DETAILED DESCRIPTION OF A PREFERRED EMBODIMENT OF THE INVENTION

Figure 1:
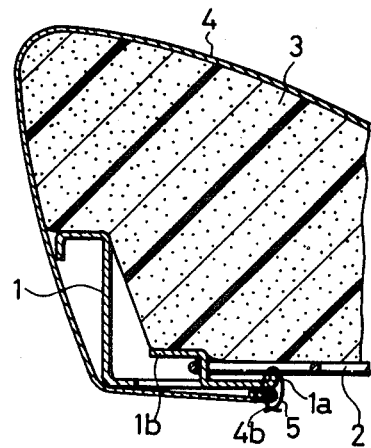
FIG. 1 is a partially longitudinal section view of a conventional structure.
Figure 2:
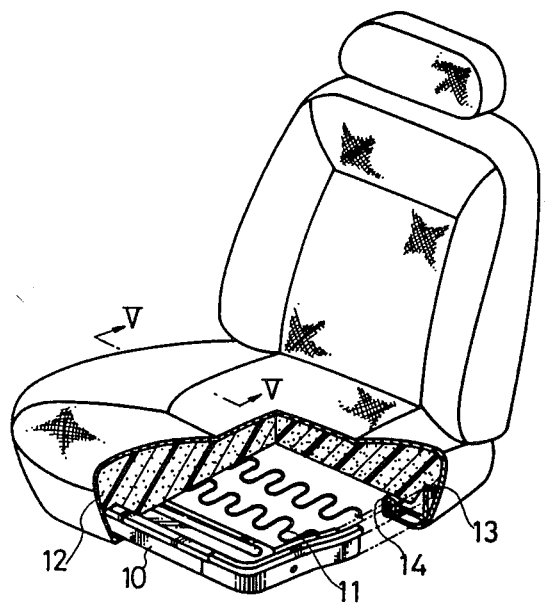
FIG. 2 is a partially cutaway perspective view of an automotive seat incorporating an embodiment of a structure constructed in accordance with the invention.

Referring first to FIG. 2, there is illustrated an automotive seat incorporating a trim cover assembly terminal end fixing structure constructed in accordance with the present invention.

Figure 3:
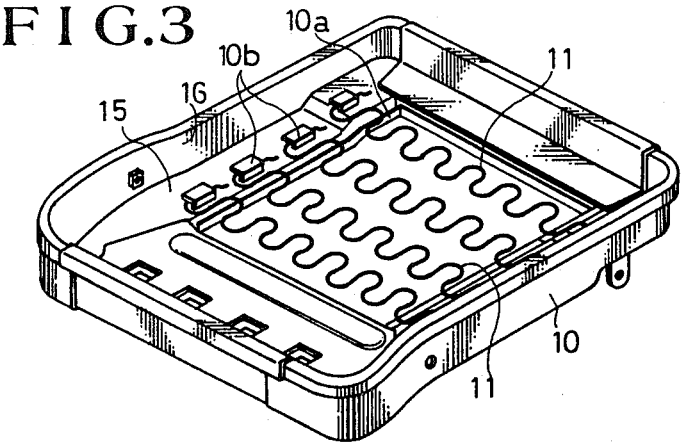
FIG. 3 is a perspective view of a seat cushion frame of the automotive seat shown in FIG. 2.
Figure 4:
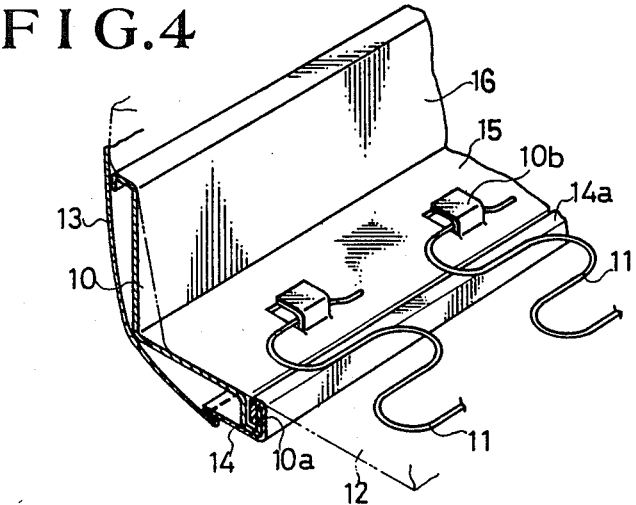
FIG. 4 is a perspective view of main portions of the seat cushion frame shown in FIG. 2; and, FIG. 5 is a longitudinal section view of the main portions shown in FIG. 4.
Figure 5:
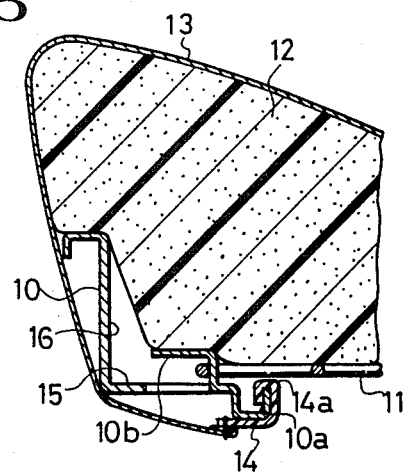

In FIG. 3, a frame (10) is illustrated in a state before a cushion member (2) formed of foam material (that is, a product which is mold formed of urethane foam) and a trim cover assembly are mounted to the frame (10).

In the drawings, the frame (10) is an L-shaped frame for a seat cushion, and it comprises a vertical portion (16) and a horizontal portion (15) folded at right angles with respect to the vertical portion (16). The horizontal portion (15) is provided at the tip end thereof with a folded portion (10a) having a U-shaped configuration with an upwardly facing opening, and it is also provided in the central portion thereof with hook pieces (10b)— which are formed by cutting and raising parts of the horizontal portion (15) at given intervals from one another. That is, the hook pieces (10b)—are provided on both horizontal portions (15) respectively arranged in the right and left sides of the frame (10), and also to the right and left hook pieces (10b) the ends of spring members (11) formed of S-springs are hitchedly secured so that the spring members (11) can be extended across the left and right hook portions (10), respectively. The above-mentioned cushion member (12) is then placed over these spring members (11). After then, the cushion member (12) and the frame (10) are covered with a trim cover assembly (13). The trim cover assembly (13) is formed by sewing into a substantially bag-shaped configuration of a well-known member such as a textile fabric used in a seat of this kind, with a belt-shaped hook (14) formed of synthetic resin (for example, vinyl chloride, polypropylene or the like) being sewn along the ends of the trim cover assembly (13) which form an opening. The hook member (14) has a terminal end (14a) to be engaged with the folded portion (10a) of the above-mentioned frame (10) from the outer surface thereof, and is also interposed between the spring member (11) and the folded portion (10a).

In the trim cover assembly terminal end fixing structure constructed in the above-mentioned manner, since the hook member (14) is sewn to the terminal end of the trim cover assembly (13) and the hook member (14) is interposed between and fixed by the folded portion (10a) and the spring member (11), the hook member (14) acts as a damper as well as a silencer and thus the spring member (11) is prevented from coming into contact with the tip end of the horizontal portion (15) of the frame (10), thereby preventing the generation of the strange sounds by the spring member (11). Also, due to the fact that the hook member (14) sewn to the trim cover assembly (13) is interposed between the spring member (11) and the frame (10) as well as the trim cover assembly (13) can be fixed to the frame (10), the trim cover assembly (13) can be mounted in an easy manner. Further, because there is no need to provide a special part to prevent the generation of the strange sounds due to the contact between the spring member (11) and the frame (10), the number of necessary parts can be reduced and thus the present fixing structure can be produced economically.

Although, in the above-mentioned embodiment of the invention, the description has been given of the trim cover assembly (13) with the synthetic resin hook member (14) sewn thereto, the hook member (14) is not limited to the synthetic resin but it may be formed of other materials that have a shock absorbing and sound arresting property.

What is claimed is:

1. A structure for fixing the terminal end of a trim cover assembly to an automotive seat having a pair of L-shaped frames each including a vertical portion and a horizontal portion, said horizontal portion being provided with a hook piece, a spring member is hookingly secured to said hook piece, a cushion member formed of foam material is placed over said spring members, and said terminal end of said trim cover assembly covering said frames, spring members, and cushion member is fixed to the tip end of said horizontal portion of said frame, said spring members extending transversely immediately above said tip end of said horizontal portion of said frame, and said tip end being vertically oriented relative to said spring members, and being provided with a U-shaped folded portion having an upwardly facing opening and extending integrally therewith characterized in that a hook member formed of synthetic resin is formed in an L-shaped configuration and is provided along the tip edge thereof with an inwardly folded engagement portion, said hook member being secured to said terminal end of said trim cover assembly and said engagement portion is then hookingly engaged with said tip end of said folded portion of said horizontal portion of said frame in a position adjacent said spring member such that said spring member contacts said hook member upon a load being applied to said seat, whereby the anchoring force of said hook member is reinforced when contact from said spring member is made.

2. A structure for fixing the terminal end of a trim cover assembly for use in an automotive seat as defined in claim 1, wherein said hook member is formed of such a material as has a shock absorbing property.

3. A structure for fixing the terminal end of a trim cover assembly for use in an automotive seat as defined in claim 1, wherein said hook member is formed of a sound arresting material.

4. A structure for fixing the terminal end of a trim cover assembly for use in an automotive seat as defined in claim 1, wherein said hook member comprises a belt-shaped member provided along said terminal end of said trim cover assembly.

* * * * *